(12) United States Patent
Chen et al.

(10) Patent No.: US 12,213,624 B1
(45) Date of Patent: Feb. 4, 2025

(54) DUAL-MODE MOO KA TA-STYLE COOKWARE WITH REMOVABLE COOKING/GRILLING SURFACE

(71) Applicants: Raweewan Chen, Wood Ridge, NJ (US); Kritikar Savaphapsakul, Jackson Heights, NY (US); Trang Thongna, Elmhurst, NY (US)

(72) Inventors: Raweewan Chen, Wood Ridge, NJ (US); Kritikar Savaphapsakul, Jackson Heights, NY (US); Trang Thongna, Elmhurst, NY (US)

( * ) Notice: Subject to any disclaimer, the term of this patent is extended or adjusted under 35 U.S.C. 154(b) by 0 days.

(21) Appl. No.: 18/756,844

(22) Filed: Jun. 27, 2024

Related U.S. Application Data

(60) Provisional application No. 63/526,620, filed on Jul. 13, 2023.

(51) Int. Cl.
*A47J 37/10* (2006.01)
(52) U.S. Cl.
CPC .................. *A47J 37/108* (2013.01)
(58) Field of Classification Search
CPC .......... A47J 37/108; A47J 37/10; A47J 37/06; A47J 37/04; A47J 37/00; Y10S 220/912
USPC ........ 220/573.1, 912; 99/339, 340, 445, 444
See application file for complete search history.

(56) References Cited

U.S. PATENT DOCUMENTS

| | | | | |
|---|---|---|---|---|
| 175,067 A * | 3/1876 | Gates | ..................... | A47J 37/067 99/445 |
| 195,995 A * | 10/1877 | Edwards | ................ | A47J 37/067 99/446 |
| 1,906,999 A * | 5/1933 | Parker | ................... | A47J 37/108 99/425 |
| 5,511,466 A * | 4/1996 | Dzibinski | ............... | A47J 37/10 D7/354 |
| 6,360,654 B1 * | 3/2002 | Cornfield | ................ | A47J 36/16 99/422 |
| 6,405,642 B1 * | 6/2002 | Morris | ................... | A47J 37/108 99/425 |
| 7,717,031 B1 * | 5/2010 | Cornfield | ................ | A47J 36/16 99/413 |

* cited by examiner

*Primary Examiner* — Robert J Hicks
(74) *Attorney, Agent, or Firm* — Kane Kessler, P.C.; Barry E. Negrin

(57) ABSTRACT

A moo ka ta-style grill pan includes an outer perimetrical wall, an inner wall, and a bottom surface connecting the outer wall and the inner wall. The bottom surface, outer wall, and inner wall form a reservoir adapted to hold soup, broth, or a similar hot liquid. A central grilling area is provided, surrounded at least partially by the reservoir; the central grilling area includes a removable grill surface. The central grilling area may be defined by the inner wall, and the removable grill surface sits thereatop. Structure for securing the removable grill surface grill atop the central grilling area, e.g. a flange disposed on at least one of the removable grill surface or a top rim of the inner wall, is provided. Holes are provided in the removable grill surface to allow drippings of food being grilled thereatop to pass therethrough and not fall into the reservoir.

12 Claims, 5 Drawing Sheets

DUAL-MODE MOO KA TA-STYLE COOKWARE WITH REMOVABLE COOKING/GRILLING SURFACE

RELATED APPLICATIONS

Priority is claimed from U.S. Provisional Patent Application No. 63/526,620 filed Jul. 13, 2023 entitled "COOKWARE WITH REMOVABLE COOKING/GRILLING SURFACE", the entirety of which is incorporated by reference herein.

BACKGROUND OF THE INVENTION

Field of the Invention

The invention is directed to cooking utensils, and more specifically to a combination grill pan and soup pot.

Description of Related Art

Moo ka ta is a popular Thai communal dish that is part hot pot and part grill. It features an assortment of raw meats, vegetables, and noodles cooked in a simmering broth or on a sizzling skillet divided into two sections. Sliced meat is grilled on the dome in the center while the vegetables and other ingredients, such as fish balls, cook in the soup. The device sits on a heat source such as burning charcoal or a fire which grills and/or boils the food. Among the best foods for this cooking method are pork, chicken, mutton, lamb, seafood, vegetables, and mushrooms.

The dish is flavored with aromatics and can be customized with seasonings and condiments. It is a social dish meant to be shared with a group of people who cook their own portions on a hot plate and dip them in various sauces. It is a fun and interactive dining experience that has gained popularity around the world.

A conventional moo ka ta grill pan 10 is shown in FIG. 1. Grill pan 10 includes a central grilling area 20 and an outer circumferential soup area or reservoir 30. Central grilling area 20 has a convex dome-shaped surface 22 which includes a number of channels or grooves 24 extending from the center of surface 22 to the perimeter or edge of surface 22. Surface 22 is integral to grilled pan 10 and cannot be removed. Central grilling area 20 is substantially hollow underneath surface 22. Surrounding central grilling area 20 is the soup reservoir 30. Soup reservoir 30 is defined by outer wall 32 spaced apart from outer side wall 26 of central grilling area 20 with a bottom surface therebetween, thereby creating a semi-toroidal receptacle 34. One or more handles 40 project outwardly from outer wall 32 to enable someone to be able to pick up the grill pan (especially when it is hot).

In conventional use, vegetables and meats are placed on surface 22, and a liquid soup or broth is placed in receptacle 34 of soup reservoir 30. Grill pan 20 is placed on top of a heat source (not shown) such as a fire, a BBQ grill, a hibachi, or the like. The heat source causes food items placed atop surface 22 to cook and sear while simultaneously heating the soup or broth in receptacle 34 of soup reservoir 30. Food can be cooked either by grilling it atop surface 22 or by simmering it in the soup in soup reservoir 30.

Despite the popularity of the conventional moo ka ta grill pan, there are a number of problems with its design. First, some people have trouble with the dome-shaped grilling surface, and food being grilled there tends to fall off into the soup reservoir. If meat (e.g., poultry or pork) falls into the soup when the meat is raw or before it is fully cooked, it may contaminate the soup if the soup has not yet reached its boiling point. Additionally, if one is trying to get a nice char on the meat or vegetables being grilled in the center, getting it sopping wet from the soup is counterproductive; while food can be cooked via grilling or boiling, not everything can be cooked well both ways, and the end result can be disappointing. Moreover, it is important to remember that moo ka ta is typically communal in nature. As a result, some people may not want some of the grilled foods of others falling into the communal soup (e.g., a vegetarian may not want someone else's meat in the soup). Additionally, nearly all meats exude or shed fat when grilled. Because of the grooves in the grilling surface and its convex shape, at least some of the fat that comes off of the meat when it is being grilled rolls directly into the soup, making an otherwise healthy broth full of unwanted fat and potentially carcinogens from the grilling process. To make matters worse, when cooking moo ka ta, a chunk of fat is commonly grilled at the apex of the pan so its grease prevents food from sticking to the grilling surface. That can also end up in the soup via channels 24.

Additionally, the conventional grill pan is fairly annoying to clean. The center grilling section gets dirty with meat quickly, and it is difficult to make later courses of food not flavored/contaminated by earlier courses of food. This can be especially concerning when dealing with people's allergies: unless the grill section is cleaned meticulously, cross contamination is likely to occur. However, in the traditional moo ka ta grill pan, the central grilling section is integral with the outer semi-toroidal soup reservoir. As such, if one wishes to clean the central grilling section, the entire grill pan is taken out of commission, and the otherwise perfectly edible soup in the reservoir is wasted. All of these and other reasons make the traditional grill pan difficult to use in a commercialized setting, especially in a restaurant subject to rigorous health code regulations.

Accordingly, there is a long felt need to provide a grill pan suitable for moo ka ta and similar cuisines in which the food being grilled in the center does not contaminate the soup inadvertently, there is little to no risk of cross contamination between courses of food, and the device is readily cleanable even during use.

SUMMARY OF THE INVENTION

The above and other objects are fulfilled by the invention, which is a dual-mode moo ka ta-style grill pan. In one embodiment, the inventive grill pan includes: an outer perimetrical wall, an inner wall; a bottom surface connecting the outer wall and the inner wall. The bottom surface, the outer wall, and the inner wall form a reservoir adapted to hold soup, broth, or a similar hot liquid or liquid-like food. The inventive grill pan also includes a central grilling area surrounded at least partially by the reservoir, the central grilling area including a removable grill surface. Preferably, the central grilling area is defined by the inner wall, and the removable grill surface sits atop the inner wall.

In one embodiment, the inventive grill pan further includes means for removably securing the removable grill surface grill atop the central grilling area. Preferably, the means for securing includes at least one flange disposed on at least one of the removable grill surface or a top rim of the inner wall.

In one embodiment, the inventive grill pan further includes holes in the removable grill surface, the holes being structured to allow drippings of food being grilled atop the removable grill surface to pass therethrough.

In one embodiment, the central grilling area is structured so that the drippings of food being grilled atop the removable grill surface do not fall into the reservoir. Preferably, the removable grill surface is substantially flat. Preferably, the removable grill surface is structured to substantially prevent drippings of food being grilled atop the removable grill surface from falling into the reservoir.

In one embodiment, the outer wall is substantially circular, the inner wall is substantially circular, and the outer wall and the inner wall are substantially concentric. Optionally, the outer wall forms an outer perimeter of the grill pan.

The invention is a two-sectioned cookware utensil. A central grilling area is surrounded at least partially by a reservoir adapted to hold soup, broth, or a similar hot liquid or liquid-like food. The reservoir is defined by the outer wall of the pan, the side wall of the central grilling area, and the bottom surface therebetween. The central grilling area has a removable grill for ease of replacement while in use without requiring the entire utensil to be replaced. Preferably, means for securing the grill atop the central grilling area is provided. In one embodiment, the means for securing take the form of one or more flanges disposed on the grill, the top rim of the side wall of the central grilling area, or both.

DETAILED DESCRIPTION OF THE INVENTION AND DRAWINGS

Figure 1:
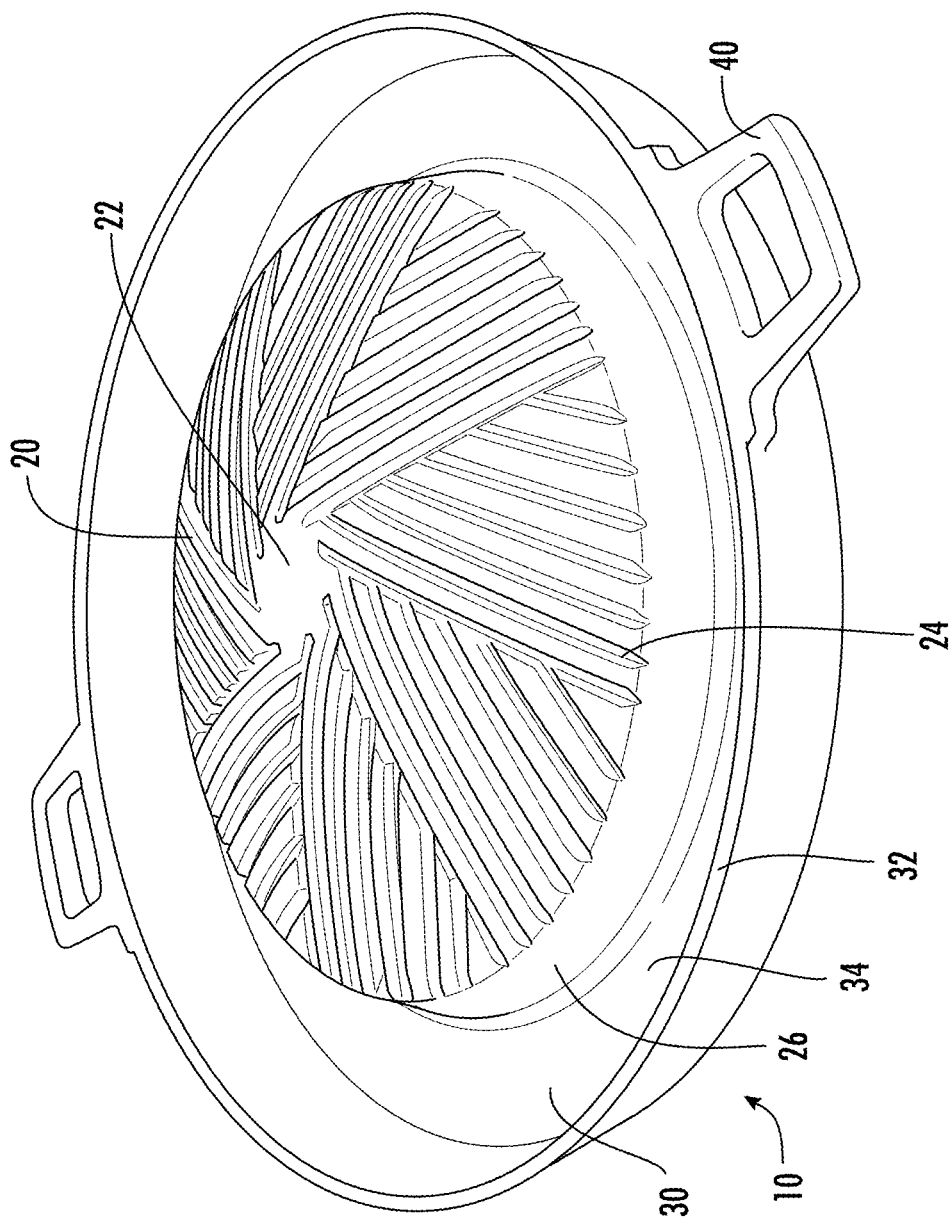
FIG. 1 is a perspective view of a conventional moo ka ta grill pan.
Figure 2:
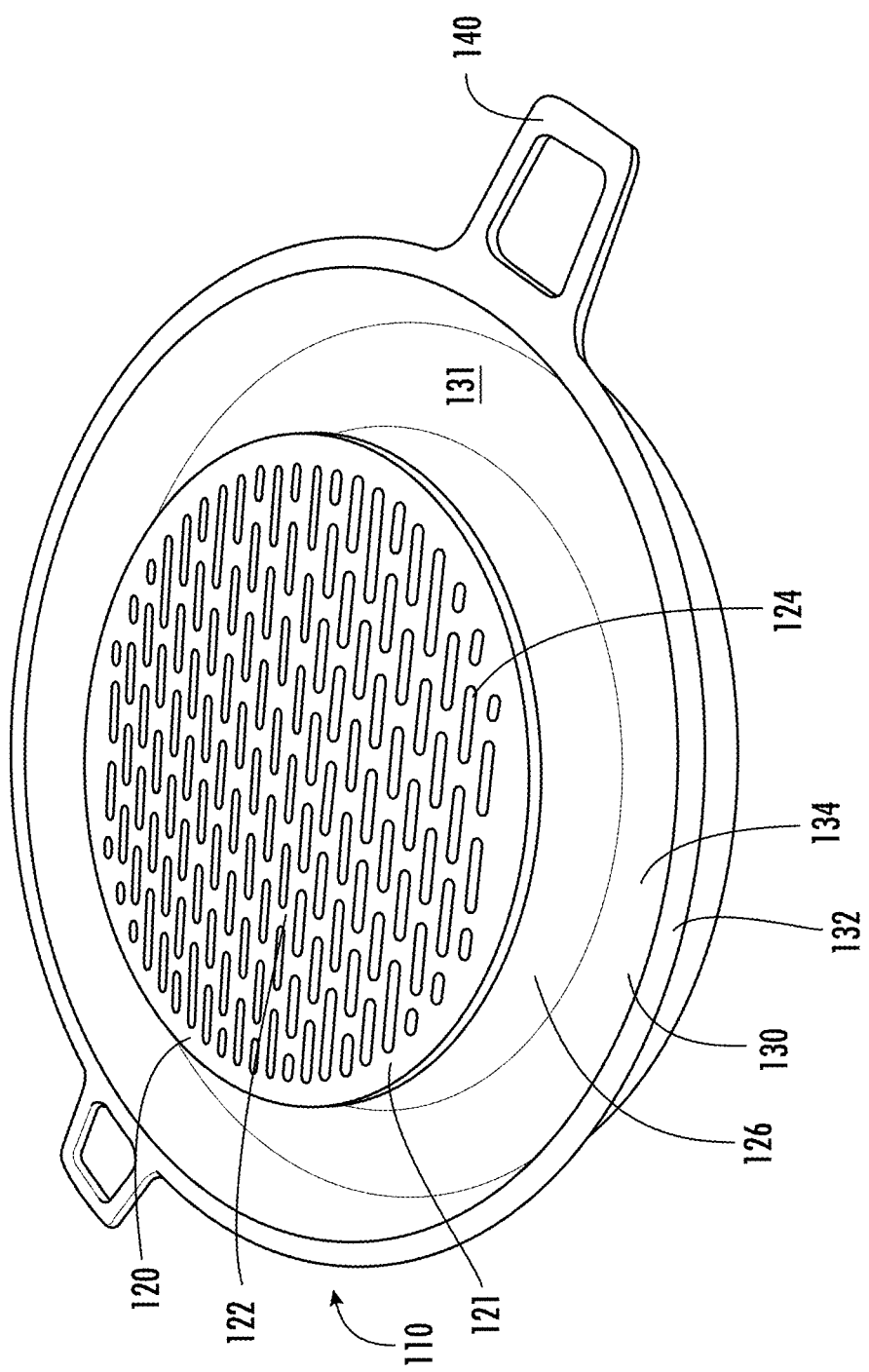
FIG. 2 is a perspective view of a grill pan in accordance with an embodiment of the invention.
Figure 3:
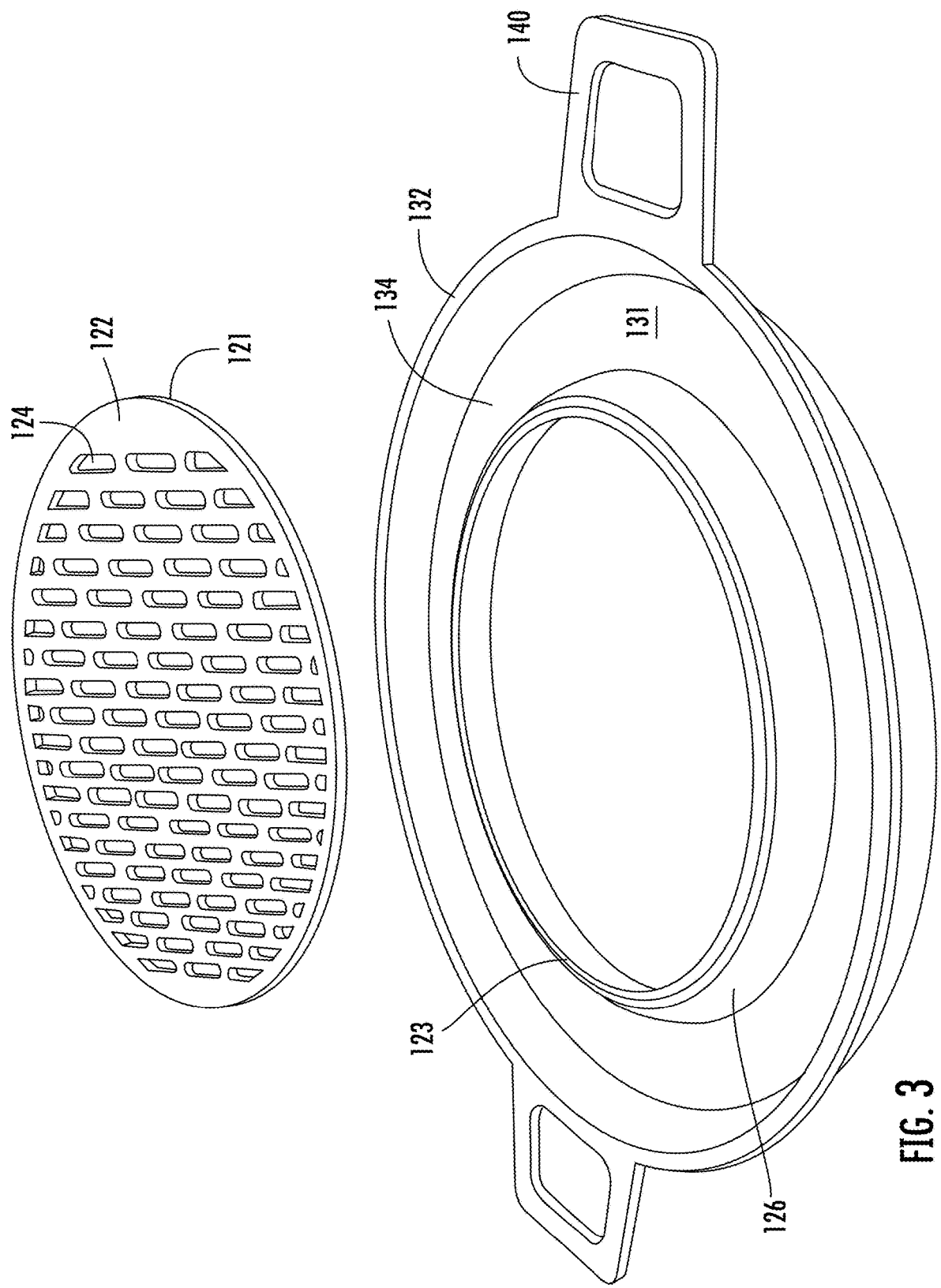
FIG. 3 is an exploded perspective view of a grill pan in accordance with an embodiment of the invention.

Description will now be given with reference to the attached FIGS. 1-4E. It should be understood that these figures are exemplary in nature and in no way serve to limit the scope of the invention, which is defined by the claims appearing hereinbelow.

A grill pan 110, suitable for use in moo ka ta cuisine, for example, in accordance with an embodiment of the invention, is shown in FIGS. 2-4B. Grill pan 110 includes a central grilling area 120 and an outer circumferential soup reservoir 130. Central grilling area 120 has a removable grill 121 that has a flat grilling surface 122 which includes a number of perforations or holes 124 extending entirely through the thickness of grill 121 to the underside thereof. Surrounding central grilling area 120 is soup reservoir 130. Soup reservoir 130 is defined by outer wall 132, spaced apart from inner wall 126 of central grilling area 120, and a bottom surface 131 therebetween, thereby creating a semi-toroidal receptacle 134. One or more handles 140 project outwardly from outer wall 132 to enable someone to be able to pick up the grill pan.

Figure 4A:
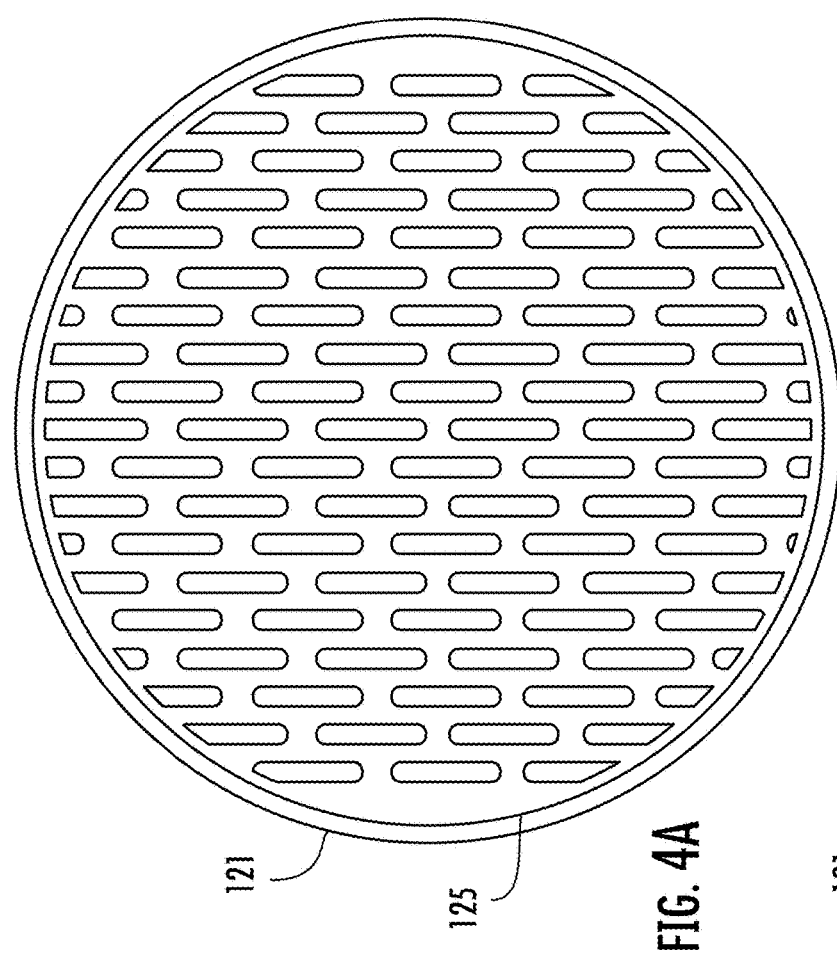
FIG. 4A is a bottom plan view of a grilling surface of a grill pan in accordance with an embodiment of the invention.
Figure 4B:
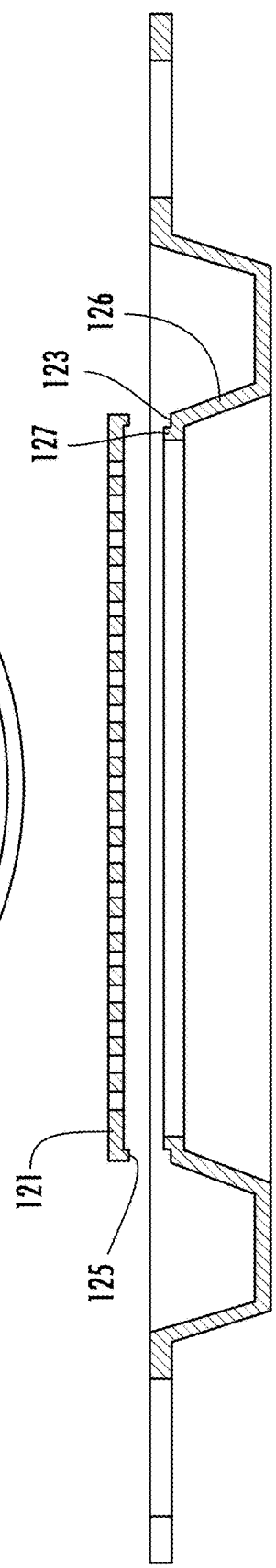
FIG. 4B is a side sectional view of a grill pan in accordance with an embodiment of the invention.

Removable grill 121 sits atop central grilling area 120 and rests on upper rim 123 of wall 126. As best shown in FIG. 4B, grill 121 has a flange 125 that projects downwardly from the underside of grill 121 around at least a portion of the perimeter of grill 121. Upper rim 123 of inner wall 126 has a flange 127 that projects upwardly around at least a portion of the perimeter of inner wall 126. In the embodiment shown, grill flange 125 is slightly larger in diameter than wall flange 127. As a result, when grill 121 is placed atop inner wall 126, grill 121 cannot easily slide off of central grilling area 120 because flange 125 will engage or engages with flange 127. Flange 125 need not be in direct, tight contact with flange 127; some space or play is acceptable without departing from the scope of the invention.

Figure 4E:
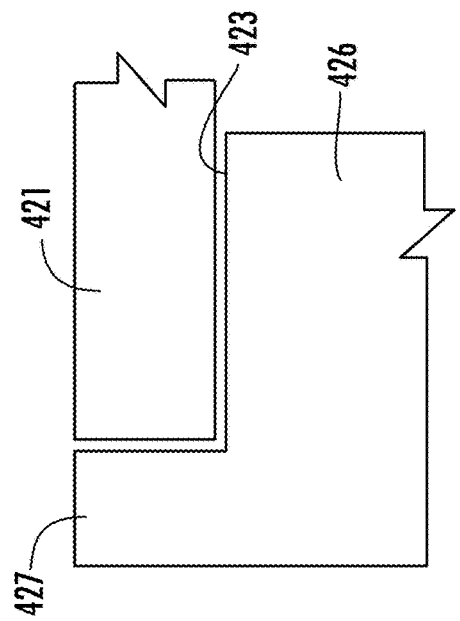
FIG. 4E is a side sectional view of yet another alternate grill securing structure in a grill pan in accordance with an embodiment of the invention.
Figure 4D:
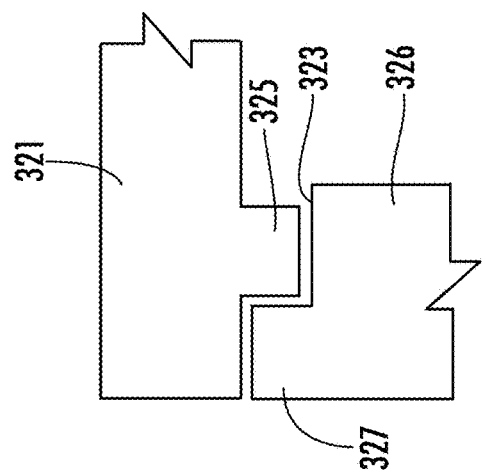
FIG. 4D is a side sectional view of another alternate grill securing structure in a grill pan in accordance with an embodiment of the invention.
Figure 4C:
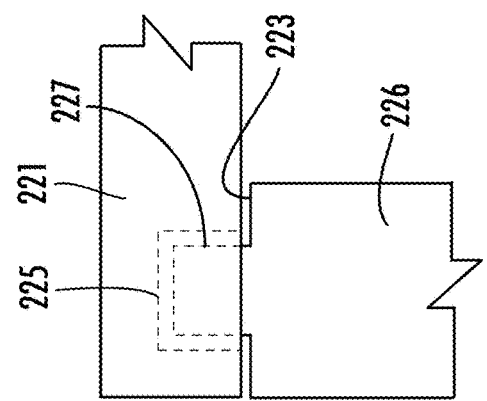
FIG. 4C is a side sectional view of an alternate grill securing structure in a grill pan in accordance with an embodiment of the invention.

Some exemplary and non-limiting alternative embodiments of the grill securing structure between the grill and the central grilling area are shown in FIGS. 4C, 4D, and 4E. In FIG. 4C, grill 221 is provided with groove 225 that flange 227 fits inside when grill 221 is placed atop wall 226 at rim 223. Groove 225 may pass fully through grill 221 or it may be more of a channel as shown in FIG. 4C and pass only partially through grill 221. In FIG. 4D, flange 325 of grill 321 is provided smaller in diameter than flange 327 of wall 326. In this embodiment, the outer edge of the underside of grill 321 may rest atop flange 327 and/or flange 325 may rest atop rim 323. In FIG. 4E, grill 421 has no flange but instead rests atop rim 423. Wall 426 has an outer flange 427 that surrounds grill 421 when grill 421 sits atop rim 423. In these and other embodiments, the grill securing structure still achieves the same or similar effect of preventing unwanted lateral movement of the grill off of the central grilling area. Other variations on the grill securing structure, e.g., pins on one of the grill and the central grilling area and mating holes/recesses on the other of the grill and the central grilling area, are contemplated.

One embodiment of the inventive grill pan is made from brass, however any typically heat-conductive and non-reactive material used in high heat cooking can be used, e.g., steel, ceramic, cast iron, aluminum, copper, borosilicate glass, and the like.

In operation, the invention works as follows. Grill pan 110 is placed over a heat source (not shown) such as a fire, BBQ grill, hibachi, etc. Soup or broth is placed in soup reservoir 130. Foods to be grilled (meats, vegetables, etc.) are placed atop grill 121. The heat source causes the soup in reservoir 130 to heat and simmer and the food atop grill 121 to cook. As the grilled food cooks, its juices and fats do not fall into the soup in reservoir 130 but rather through holes 124 and below into the fire/heat source. Because grill 121 is easily removable from central grilling area 120, it can be cleaned and replaced in between courses or as people at a communal meal rotate in or out without disrupting the soup in reservoir 130. Moo ka ta restaurants and similar commercial settings can keep a stock of grills on hand to swap out at a moment's notice without requiring the entire grill pan to be taken out of service for cleaning.

The invention is not limited to the above description. For example, the embodiments shown and described are all circular, however they can be of any shape (e.g., polygonal, oval, star-shaped, a design, etc.). Similarly, the drawings depict the grill pan having two handles, however more handles may be provided, or one single handle may be provided, e.g., in the manner of a frying pan. Additionally, the holes in the grill need not be of the pattern, shape, or configuration shown in the drawings but can be of any pattern, shape, or configuration.

It should be understood that, in the context of this disclosure, "at least one of" followed by a series of elements means any one of the elements in the series or any combination of the elements in the series, including all of the elements. So, for example, a recitation of "at least one of A, B, or C" means any of A, B, C, A+B, A+C, B+C, or A+B+C.

Having described certain embodiments of the invention, it should be understood that the invention is not limited to the above description or the attached exemplary drawings. Rather, the scope of the invention is defined by the claims appearing hereinbelow and includes any equivalents thereof as would be appreciated by one of ordinary skill in the art.

What is claimed is:

1. A moo ka ta-style grill pan, comprising:
    an outer wall;
    an inner wall;
    a bottom surface connecting said outer wall and said inner wall;
    said bottom surface, said outer wall, and said inner wall forming a reservoir adapted to hold soup, broth, a hot liquid food, or a semi-liquid food; and
    a central grilling area surrounded at least partially by said reservoir, said central grilling area including a removable grill surface.

2. A moo ka ta-style grill pan according to claim 1, wherein said central grilling area is defined by said inner wall, and said removable grill surface sits atop said inner wall.

3. A moo ka ta-style grill pan according to claim 1, further comprising means for removably securing said removable grill surface atop said central grilling area.

4. A moo ka ta-style grill pan according to claim 3, said means for removably securing said removable grill surface comprising at least one flange disposed on at least one of said removable grill surface or a top rim of said inner wall.

5. A moo ka ta-style grill pan according to claim 2, further comprising means for removably securing said removable grill surface atop said central grilling area.

6. A moo ka ta-style grill pan according to claim 5, said means for removably securing said removable grill surface comprising at least one flange disposed on at least one of said removable grill surface or a top rim of said inner wall.

7. A moo ka ta-style grill pan according to claim 1, further comprising holes in said removable grill surface, said holes structured to allow drippings of food being grilled atop said removable grill surface to pass therethrough.

8. A moo ka ta-style grill pan according to claim 7, wherein said central grilling area is structured so that the drippings of food being grilled atop said removable grill surface do not fall into said reservoir.

9. A moo ka ta-style grill pan according to claim 1, wherein said removable grill surface is substantially flat.

10. A moo ka ta-style grill pan according to claim 1, wherein said removable grill surface is structured to substantially prevent drippings of food being grilled atop said removable grill surface from falling into said reservoir.

11. A moo ka ta-style grill pan according to claim 1, wherein said outer wall is substantially circular, said inner wall is substantially circular, and said outer wall and said inner wall are substantially concentric.

12. A moo ka ta-style grill pan according to claim 1, wherein said outer wall forms an outer perimeter of said grill pan.

* * * * *